Feb. 18, 1936. S. H. NEGROTTO 2,030,889
MOUNT FOR MACHINE GUNS
Filed April 1, 1933
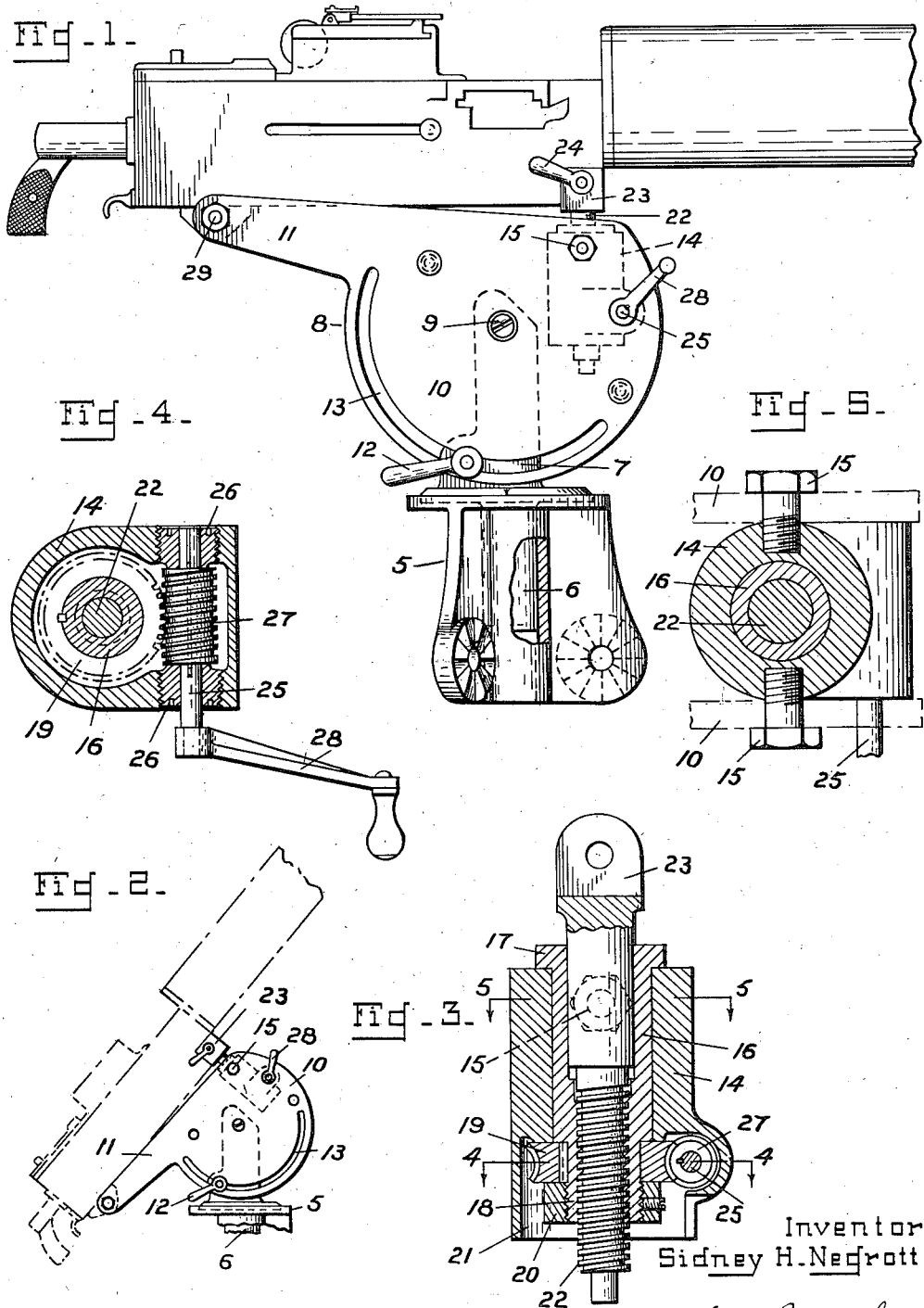
Inventor
Sidney H. Negrotto
By W. N. Roach
Attorney Patented Feb. 18, 1936

2,030,889

UNITED STATES PATENT OFFICE 2,030,889

MOUNT FOR MACHINE GUNS

Sidney H. Negrotto, United States Army, Fort Benning, Ga.

Application April 1, 1933, Serial No. 663,949

3 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a mount for machine guns.

In directing machine guns at low angles against ground targets a low mount is required in order to provide stability and meet the tactical requirements of the weapon. The employment of aircraft against ground targets and the consequent necessity of establishing a defense against this form of attack has resulted in reconstruction and modification of the standard infantry mount to render it capable of delivering effective fire at high angles.

The purpose of the present invention is to provide a gun mount that may be easily and quickly adjusted from low angle to high angle firing positions without the necessity of removing the gun or any of the parts of the mount.

A further object of the invention is to provide an all-around traverse in an elevated position without raising the gun trunnions.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation of the improved mount in position of adjustment for firing at ground targets.

Fig. 2 is a view of the mount in position of adjustment for anti-aircraft firing.

Fig. 3 is a longitudinal sectional view of the elevating mechanism.

Figs. 4 and 5 are sectional views on the respective lines of Fig. 3.

The mount consists of a socketed head 5 for receiving the pintle 6 of a standard 7. The cradle 8, consisting of plates spaced to receive the standard, is mounted on the standard through the trunnion pin 9. The cradle plates are identical each having a circular portion 10 and a relatively narrow projecting arm 11. A clamping bolt 12 passing through arcuate slots 13 in the cradle plates and through the standard 7 permits the cradle to be firmly locked in various positions of adjustment. The slots 13 are of sufficient extent to enable the cradle to be depressed below the horizontal and to be elevated 90 degrees to a vertical position as shown in Fig. 2.

An elevating mechanism is carried by a housing 14 positioned between the cradle plates forwardly of the standard 7 and supported by means of screw bolts 15 passing through the cradle plates. A sleeve 16 inserted in the housing from the top and supported thereon by a collar 17 has a reduced lower extremity 18 on which is keyed a worm wheel 19 retained by a nut 20. The worm wheel and nut are disposed in a recess 21 in the housing.

The sleeve 16 is internally threaded for engagement with the threaded stem 22 of a yoke 23 that is adapted to receive a gun and be secured thereto by means of a pin 24.

A shaft 25 mounted in the lower front portion of the housing by means of plugs 26 threadedly secured therein, carries a worm 27 meshing with the worm wheel 19. The shaft extends through one of the cradle plates and is rotated by means of a handle 28.

The arms 11 of the cradle plates are provided with aligned apertures for receiving a pin 29 that serves to connect the rear of the gun to the cradle.

With the elevating mechanism positioned at the front of the cradle instead of at the rear as has been the practice, the accuracy of fire and the facility of manipulation have been increased when the mount is in position for low angle firing.

In the position of high angle firing the elevating mechanism does not interfere with the head of the mount as is the case when it is carried at the rear of the cradle.

The adjustment of the cradle for low or high angle firing is accomplished by releasing the clamping bolt 12, rotating the cradle about the trunnion pin 9 to the desired position, and then engaging the clamping bolt.

I claim:

1. In a gun mount, a support rotatable on a vertical pivot, a cradle trunnioned on the support and including spaced plates having arcuate slots, a clamping bolt passing through the slots and the support, an elevating mechanism housing positioned between the cradle plates forwardly of the support and secured to the cradle plates, a sleeve within the housing, a gun attaching member threadedly engaged with the interior of the sleeve, a worm wheel fixed to the sleeve, a shaft mounted in the housing and extending through one of the cradle plates, a worm on said shaft meshing with the worm wheel and a gun attaching member at the rear of the cradle.

2. In a gun mount, a support rotatable on a vertical pivot, a cradle trunnioned on the support and including spaced plates, a housing positioned between the cradle plates forwardly of the support and secured to the cradle plates, an elevating mechanism carried by the housing and having a gun attaching member, an actuator for the elevating mechanism extending through one of the cradle plates and a gun-attaching member on the rear of the cradle.

3. In a gun mount, a support rotatable on a vertical pivot, a cradle trunnioned on the support and including spaced plates, a housing positioned between the cradle plates forwardly of the support and secured to the cradle plates, an elevating mechanism carried by the housing and having a gun attaching member, and a gun-attaching member on the rear of the cradle.

SIDNEY H. NEGROTTO.